US012665435B2

(12) United States Patent
De Angelis et al.

(10) Patent No.: US 12,665,435 B2
(45) Date of Patent: Jun. 23, 2026

(54) SYSTEM TO CHARGE CELLS ASSEMBLED INTO A BATTERY

(71) Applicant: URBAN ELECTRIC POWER INC., Pearl River, NY (US)

(72) Inventors: Valerio De Angelis, Santa Barbara, CA (US); Irving Derin, New York, NY (US); Sullivan Fleming, New York, NY (US); Sanjoy Banerjee, New York, NY (US)

(73) Assignee: URBAN ELECTRIC POWER INC., Pearl River, NY (US)

( * ) Notice: Subject to any disclaimer, the term of this patent is extended or adjusted under 35 U.S.C. 154(b) by 696 days.

(21) Appl. No.: 16/648,917

(22) PCT Filed: Sep. 21, 2018

(86) PCT No.: PCT/US2018/052134
§ 371 (c)(1),
(2) Date: Mar. 19, 2020

(87) PCT Pub. No.: WO2019/060665
PCT Pub. Date: Mar. 28, 2019

(65) Prior Publication Data
US 2020/0287394 A1 Sep. 10, 2020

Related U.S. Application Data

(60) Provisional application No. 62/561,996, filed on Sep. 22, 2017.

(51) Int. Cl.
*H02J 7/56* (2026.01)
*H01M 10/24* (2006.01)
(Continued)

(52) U.S. Cl.
CPC ............... *H02J 7/56* (2026.01); *H01M 10/24* (2013.01); *H01M 10/441* (2013.01); *H02J 7/40* (2026.01);
(Continued)

(58) Field of Classification Search
CPC .... H02J 7/0016; H02J 7/0018; H02J 7/00032; H02J 7/0024; H02J 7/007182; H01M 10/441
(Continued)

(56) References Cited

U.S. PATENT DOCUMENTS 4,238,721 A * 12/1980 DeLuca ................ H02J 7/0016
320/122
5,055,763 A * 10/1991 Johnson ............ H02J 7/007182
320/125
(Continued)

FOREIGN PATENT DOCUMENTS

WO WO-2009128079 A1 * 10/2009 ............ H02J 7/0068
WO WO-2009128080 A1 * 10/2009 ............ H02J 7/0024
(Continued)

OTHER PUBLICATIONS

Merriam-Webster's Collegiate Dictionary 1000 (11th ed. 2012).*
(Continued)

*Primary Examiner* — John T Trischler
(74) *Attorney, Agent, or Firm* — Andrew M. Metrailer; Conley Rose, P.C.

(57) ABSTRACT

A charger for a plurality of cells comprises a plurality of cells, a plurality of DC power sources, a common DC source in electrical communication with each of the plurality of DC power sources, and a CPU configured to selectively control the connection between each DC power source and the corresponding cell. Each DC power source of the plurality
(Continued)

of DC power sources is selectively connectable to a corresponding cell of the plurality of cells.

20 Claims, 6 Drawing Sheets

(51) Int. Cl.
 *H01M 10/44* (2006.01)
 *H02J 7/40* (2026.01)
 *H02J 7/50* (2026.01)
 *H02J 7/96* (2026.01)
 *H02J 7/54* (2026.01)

(52) U.S. Cl.
 CPC ................ *H02J 7/575* (2026.01); *H02J 7/96* (2026.01); *H01M 2300/0014* (2013.01); *H02J 7/54* (2026.01); *H02J 2207/20* (2020.01)

(58) Field of Classification Search
 USPC ........................................................ 320/118
 See application file for complete search history.

(56) References Cited

U.S. PATENT DOCUMENTS

| | | | | |
|---|---|---|---|---|
| 5,291,116 A * | 3/1994 | Feldstein | .............. | H02J 7/0018 320/119 |
| 5,666,006 A * | 9/1997 | Townsley | .............. | H02J 7/0024 320/124 |
| 5,691,620 A * | 11/1997 | Nagai | ................... | H01M 10/44 320/152 |
| 5,726,551 A * | 3/1998 | Miyazaki | ................ | B60L 53/12 320/155 |
| 5,923,150 A * | 7/1999 | Umetsu | ............ | H02J 7/007182 320/159 |
| 5,955,867 A * | 9/1999 | Cummings | ............... | H02J 7/00 320/160 |
| 6,057,670 A * | 5/2000 | Sink | ...................... | H02J 7/0024 320/117 |
| 6,329,792 B1 * | 12/2001 | Dunn | ................... | G01R 31/396 320/132 |
| 6,586,910 B2 * | 7/2003 | Matsui | ................. | H02J 7/0016 320/122 |
| 6,741,065 B1 * | 5/2004 | Ishii | ........................ | B60L 53/14 320/122 |
| 6,771,046 B2 * | 8/2004 | Ariga | ...................... | H02J 7/875 320/160 |
| 6,791,297 B2 * | 9/2004 | Ott | ........................ | H02J 7/0018 320/116 |
| 7,135,836 B2 * | 11/2006 | Kutkut | ................... | H02J 7/022 320/116 |
| 7,282,814 B2 * | 10/2007 | Jacobs | .................. | H02J 7/0018 307/82 |
| 7,394,225 B2 * | 7/2008 | Guang | ..................... | H02J 7/56 320/141 |
| 7,489,106 B1 * | 2/2009 | Tikhonov | .............. | H02J 7/0018 320/116 |
| 7,554,292 B2 * | 6/2009 | Veselic | ................. | H02J 7/0022 320/124 |
| 7,573,235 B2 * | 8/2009 | Hand | .................... | H02J 7/0016 320/123 |
| 7,642,748 B2 * | 1/2010 | Glosser, Jr. | .......... | H02J 7/0018 320/116 |
| 7,696,725 B2 * | 4/2010 | Liu | ....................... | H02J 7/0018 320/136 |
| 7,948,212 B2 * | 5/2011 | Odaohhara | ....... | H02J 7/007192 320/128 |
| 7,973,515 B2 * | 7/2011 | Densham | ............ | H02J 7/00714 320/130 |
| 8,072,185 B2 * | 12/2011 | Nam | ................... | H01M 10/486 320/116 |
| 8,148,942 B2 * | 4/2012 | Densham | .............. | H02J 7/0018 323/332 |
| 8,305,040 B2 * | 11/2012 | Chen | ......................... | H02J 7/65 320/132 |
| 8,305,041 B2 * | 11/2012 | Takeda | .................... | H02J 7/663 320/134 |
| 8,423,210 B2 * | 4/2013 | Kato | ..................... | B60W 10/26 701/22 |
| 8,470,464 B2 * | 6/2013 | Troutman | ........... | H01M 50/512 429/150 |
| 8,558,510 B2 * | 10/2013 | Moon | ..................... | H02J 3/144 320/140 |
| 8,564,246 B2 * | 10/2013 | Wade | .................... | H02J 7/0018 320/119 |
| 8,598,844 B2 * | 12/2013 | Densham | .............. | H02J 7/0018 323/332 |
| 8,643,325 B2 * | 2/2014 | Yang | ..................... | H02J 7/0024 320/107 |
| 8,643,334 B2 * | 2/2014 | Kuo | .......................... | H02J 7/56 320/122 |
| 8,773,069 B2 * | 7/2014 | Tanno | ................... | H01M 10/44 320/124 |
| 8,860,371 B2 * | 10/2014 | Yang | ..................... | H02J 7/0024 320/116 |
| 8,957,624 B2 * | 2/2015 | Nysen | ................... | H02J 7/0016 320/117 |
| 9,130,378 B2 * | 9/2015 | Densham | .............. | H02J 7/0018 |
| 9,225,181 B2 * | 12/2015 | Taniguchi | ................. | H02J 7/56 |
| 9,270,127 B2 * | 2/2016 | Coenen | ................. | H02J 7/0026 |
| 9,300,148 B2 * | 3/2016 | Oh | ......................... | H02J 7/0013 |
| 9,368,979 B2 * | 6/2016 | Gong | ..................... | H02J 7/0014 |
| 9,379,373 B2 * | 6/2016 | Banerjee | .............. | H01M 10/30 |
| 9,438,050 B2 * | 9/2016 | Takeda | .................... | H02J 7/663 |
| 9,466,991 B2 * | 10/2016 | Ling | ..................... | H02J 7/0018 |
| 9,537,331 B2 * | 1/2017 | Kim | ...................... | H02J 7/0016 |
| 9,548,619 B2 * | 1/2017 | Gazit | .................... | H02J 7/0013 |
| 9,735,590 B2 * | 8/2017 | Wang | .................... | H02J 7/0018 |
| 9,755,440 B2 * | 9/2017 | Ishibashi | .............. | H02J 7/0018 |
| 9,937,815 B2 * | 4/2018 | Smidebrant | ......... | H01M 10/441 |
| 9,960,611 B2 * | 5/2018 | Toya | .................... | H02J 7/0048 |
| 10,056,764 B2 * | 8/2018 | Nysen | ................. | H02J 7/0014 |
| 10,153,651 B2 * | 12/2018 | Taylor | ................... | H02J 7/0021 |
| 10,193,192 B2 * | 1/2019 | Gagneur | ............ | H01M 10/482 |
| 10,199,639 B2 * | 2/2019 | Yadav | ................... | H01M 4/623 |
| 10,211,491 B2 * | 2/2019 | Turney | ................. | C25B 11/077 |
| 10,211,659 B2 * | 2/2019 | Tian | .................... | H02J 7/00712 |
| 10,230,132 B2 * | 3/2019 | Menard | ................ | H01M 10/24 |
| 10,230,244 B2 * | 3/2019 | Zhang | ....................... | H02J 7/04 |
| 10,263,430 B2 * | 4/2019 | Narla | ........................ | H02J 3/38 |
| 10,276,860 B2 * | 4/2019 | Yadav | ................... | H01M 4/625 |
| 10,305,286 B2 * | 5/2019 | Narla | ...................... | H02J 3/32 |
| 10,424,958 B2 * | 9/2019 | Tian | .................... | H02J 7/00712 |
| 10,447,047 B2 * | 10/2019 | Nguyen | ............... | H02J 7/0024 |
| 10,461,642 B2 * | 10/2019 | Syouda | .............. | H01M 10/482 |
| 10,498,146 B2 * | 12/2019 | Wu | ........................ | H02J 7/007 |
| 10,505,376 B2 * | 12/2019 | Sugeno | ................ | H02J 7/0021 |
| 10,601,239 B2 * | 3/2020 | Taylor | ................. | H01M 4/0447 |
| 10,644,510 B2 * | 5/2020 | Narla | ................... | H02J 7/0068 |
| 10,671,138 B2 * | 6/2020 | Altobelli | ............... | H02J 7/0022 |
| 10,763,553 B2 * | 9/2020 | Huang | ................. | H02J 7/007 |
| 10,778,025 B2 * | 9/2020 | Gazit | ........................ | H02J 7/02 |
| 10,886,766 B2 * | 1/2021 | Luo | ...................... | H01M 10/44 |
| 10,903,661 B2 * | 1/2021 | Nysen | ................. | H02J 7/0016 |
| 10,910,858 B2 * | 2/2021 | Taylor | ................. | H02J 7/007 |
| 10,910,860 B2 * | 2/2021 | Fu | ........................... | H02J 7/933 |
| 11,070,073 B2 * | 7/2021 | Tiedtke | ................... | H02J 7/005 |
| 11,145,913 B2 * | 10/2021 | Sato | .................... | G01R 31/3835 |
| 11,177,684 B2 * | 11/2021 | Xiao | ...................... | H02J 7/345 |
| 11,381,094 B2 * | 7/2022 | Park | ...................... | H02J 7/575 |
| 11,536,774 B2 * | 12/2022 | Nakai | ................... | G06Q 50/06 |
| 11,539,222 B2 * | 12/2022 | Ono | ...................... | H02J 7/0016 |
| 11,545,840 B2 * | 1/2023 | Wu | ....................... | H02J 7/0014 |
| 11,616,374 B2 * | 3/2023 | Ono | ................. | H02J 7/007182 320/122 |
| 11,616,375 B2 * | 3/2023 | Nysen | ................ | H01M 10/052 320/103 |
| 11,635,469 B2 * | 4/2023 | Ootsuka | ................. | H02J 7/0048 702/63 |
| 11,644,877 B2 * | 5/2023 | Matsumura | ....... | H02J 7/007194 713/340 |

(56)          References Cited

U.S. PATENT DOCUMENTS

| | | | | |
|---|---|---|---|---|
| 11,863,009 | B2 * | 1/2024 | Matsumura | H02J 7/18 |
| 12,342,761 | B2 * | 7/2025 | Liu | A01D 34/64 |
| 2002/0034470 | A1 * | 3/2002 | Yamamoto | C01G 53/04 |
| | | | | 423/592.1 |
| 2003/0049528 | A1 * | 3/2003 | Honbo | H01M 4/21 |
| | | | | 429/209 |
| 2003/0137282 | A1 * | 7/2003 | Kainthla | H01M 10/30 |
| | | | | 320/161 |
| 2003/0169017 | A1 * | 9/2003 | Ariga | H02J 7/875 |
| | | | | 320/125 |
| 2004/0012371 | A1 * | 1/2004 | Ott | H02J 7/0018 |
| | | | | 320/116 |
| 2004/0076878 | A1 * | 4/2004 | Ndzebet | H01M 4/62 |
| | | | | 429/212 |
| 2004/0151981 | A1 * | 8/2004 | Spahr | C01B 32/225 |
| | | | | 429/232 |
| 2004/0185329 | A1 * | 9/2004 | Kainthla | H01M 4/62 |
| | | | | 429/59 |
| 2004/0189251 | A1 * | 9/2004 | Kutkut | H02J 7/02 |
| | | | | 320/128 |
| 2004/0197656 | A1 * | 10/2004 | Durkot | H01M 4/06 |
| | | | | 429/229 |
| 2005/0156567 | A1 * | 7/2005 | Guderzo | H02J 7/0024 |
| | | | | 320/118 |
| 2005/0194937 | A1 * | 9/2005 | Jacobs | H02J 7/0018 |
| | | | | 320/135 |
| 2005/0275374 | A1 * | 12/2005 | Guang | H02J 7/56 |
| | | | | 320/116 |
| 2006/0083955 | A1 * | 4/2006 | Kanouda | H01M 16/006 |
| | | | | 320/101 |
| 2006/0122655 | A1 * | 6/2006 | Greatbatch | H01M 6/40 |
| | | | | 607/33 |
| 2006/0122657 | A1 * | 6/2006 | Deal | H01M 10/441 |
| | | | | 607/34 |
| 2006/0226810 | A1 * | 10/2006 | Yang | H02J 7/00047 |
| | | | | 320/116 |
| 2006/0255769 | A1 * | 11/2006 | Liu | H01M 10/441 |
| | | | | 320/134 |
| 2007/0069690 | A1 * | 3/2007 | Hand | H02J 7/0016 |
| | | | | 320/128 |
| 2007/0090797 | A1 * | 4/2007 | Glosser, Jr. | H02J 7/0018 |
| | | | | 320/116 |
| 2008/0042493 | A1 * | 2/2008 | Jacobs | H02J 7/0018 |
| | | | | 307/82 |
| 2008/0218130 | A1 * | 9/2008 | Guo | H01M 10/482 |
| | | | | 320/162 |
| 2008/0238367 | A1 * | 10/2008 | Guderzo | H02J 7/1407 |
| | | | | 320/117 |
| 2009/0001937 | A1 * | 1/2009 | Densham | H02J 7/04 |
| | | | | 320/145 |
| 2009/0058370 | A1 * | 3/2009 | Odaohhara | H02J 7/007194 |
| | | | | 320/152 |
| 2009/0160405 | A1 * | 6/2009 | Takeda | H02J 7/663 |
| | | | | 320/152 |
| 2009/0237032 | A1 * | 9/2009 | Nam | H01M 10/488 |
| | | | | 320/116 |
| 2009/0251100 | A1 * | 10/2009 | Incledon | H02J 7/0016 |
| | | | | 320/137 |
| 2010/0100265 | A1 * | 4/2010 | Kato | B60L 58/13 |
| | | | | 701/22 |
| 2010/0121511 | A1 * | 5/2010 | Onnerud | B60L 58/15 |
| | | | | 701/22 |
| 2010/0127669 | A1 * | 5/2010 | Iida | B60L 58/12 |
| | | | | 320/162 |
| 2011/0101916 | A1 * | 5/2011 | Densham | H02J 7/0018 |
| | | | | 320/116 |
| 2011/0140667 | A1 * | 6/2011 | Moon | H02J 7/00716 |
| | | | | 320/134 |
| 2011/0169459 | A1 * | 7/2011 | Chen | H02J 7/65 |
| | | | | 320/160 |
| 2011/0199054 | A1 * | 8/2011 | Burchardt | H01M 12/08 |
| | | | | 320/139 |
| 2011/0199055 | A1 * | 8/2011 | Burchardt | H01M 10/48 |
| | | | | 320/148 |
| 2011/0241623 | A1 * | 10/2011 | Wade | H02J 7/0018 |
| | | | | 320/119 |
| 2011/0248678 | A1 * | 10/2011 | Wade | H02J 7/0026 |
| | | | | 320/119 |
| 2011/0267006 | A1 * | 11/2011 | Tanno | H01M 10/44 |
| | | | | 320/116 |
| 2012/0038323 | A1 * | 2/2012 | Densham | H02J 7/0018 |
| | | | | 320/137 |
| 2012/0094150 | A1 * | 4/2012 | Troutman | H01M 50/51 |
| | | | | 429/61 |
| 2012/0146588 | A1 * | 6/2012 | Ishibashi | H02J 7/0018 |
| | | | | 320/138 |
| 2012/0187898 | A1 * | 7/2012 | Nysen | H02J 7/0014 |
| | | | | 320/118 |
| 2012/0235626 | A1 * | 9/2012 | Oh | H02M 3/3353 |
| | | | | 320/103 |
| 2012/0235641 | A1 * | 9/2012 | Yang | H02J 7/0068 |
| | | | | 320/110 |
| 2012/0249055 | A1 * | 10/2012 | Wade | H02J 7/0019 |
| | | | | 320/107 |
| 2012/0249071 | A1 * | 10/2012 | Yang | H02J 7/0024 |
| | | | | 320/110 |
| 2012/0262121 | A1 * | 10/2012 | Kuo | H02J 7/56 |
| | | | | 320/128 |
| 2013/0026997 | A1 * | 1/2013 | Takeda | H02J 7/663 |
| | | | | 320/134 |
| 2013/0113431 | A1 * | 5/2013 | Banerjee | H01M 4/32 |
| | | | | 320/134 |
| 2013/0127419 | A1 * | 5/2013 | Peter | H02J 7/0014 |
| | | | | 320/119 |
| 2014/0009092 | A1 * | 1/2014 | Ma | B60L 58/22 |
| | | | | 318/139 |
| 2014/0009117 | A1 * | 1/2014 | Ishii | H02J 7/0048 |
| | | | | 320/126 |
| 2014/0021923 | A1 * | 1/2014 | Uchida | H02J 7/0016 |
| | | | | 320/118 |
| 2014/0070761 | A1 * | 3/2014 | Labbe | A61N 1/378 |
| | | | | 320/108 |
| 2014/0084871 | A1 * | 3/2014 | Densham | H02J 7/0018 |
| | | | | 320/119 |
| 2014/0117936 | A1 * | 5/2014 | Taniguchi | H02J 7/56 |
| | | | | 320/126 |
| 2014/0197794 | A1 * | 7/2014 | Gu | H01M 50/204 |
| | | | | 320/112 |
| 2014/0210405 | A1 * | 7/2014 | Yang | H02J 50/10 |
| | | | | 320/108 |
| 2014/0265606 | A1 * | 9/2014 | Gazit | H02J 7/0068 |
| | | | | 307/82 |
| 2014/0340044 | A1 * | 11/2014 | Kim | H02J 7/0016 |
| | | | | 320/134 |
| 2014/0347003 | A1 * | 11/2014 | Sporck | H02J 1/102 |
| | | | | 320/107 |
| 2014/0354212 | A1 * | 12/2014 | Sugeno | H01M 10/482 |
| | | | | 320/136 |
| 2015/0064512 | A1 * | 3/2015 | Turney | H01M 4/32 |
| | | | | 429/50 |
| 2015/0155721 | A1 * | 6/2015 | Nysen | H01M 10/441 |
| | | | | 320/103 |
| 2015/0188337 | A1 * | 7/2015 | Dewa | H02J 7/0024 |
| | | | | 320/112 |
| 2015/0263390 | A1 * | 9/2015 | Gagneur | H01M 50/574 |
| | | | | 429/61 |
| 2016/0105042 | A1 * | 4/2016 | Taylor | H02J 7/007 |
| | | | | 320/134 |
| 2016/0137092 | A1 * | 5/2016 | Thieme | B60W 30/192 |
| | | | | 307/10.6 |
| 2016/0193939 | A1 * | 7/2016 | Smidebrant | B60L 53/00 |
| | | | | 701/22 |
| 2016/0301226 | A1 * | 10/2016 | Matsumura | H02J 7/007182 |
| 2016/0308376 | A1 * | 10/2016 | Sorhage | H02J 7/0069 |
| 2016/0344219 | A1 * | 11/2016 | Lee | H02J 7/933 |
| 2017/0025865 | A1 * | 1/2017 | Imazaki | H02J 7/007194 |
| 2017/0047740 | A1 * | 2/2017 | Narla | H02J 3/32 |
| 2017/0047741 | A1 * | 2/2017 | Narla | H02J 7/35 |

(56) References Cited

U.S. PATENT DOCUMENTS

| 2017/0047742 A1* | 2/2017 | Narla | H02J 7/007 |
| 2017/0063108 A1* | 3/2017 | Wang | H01M 10/441 |
| 2017/0098940 A1* | 4/2017 | Syouda | G01R 31/3835 |
| 2017/0110765 A1* | 4/2017 | Yadav | H01M 10/24 |
| 2017/0117721 A1* | 4/2017 | Toya | H02J 7/0013 |
| 2017/0201113 A1* | 7/2017 | Gazit | H02J 7/0013 |
| 2017/0207447 A1* | 7/2017 | Yadav | H01M 4/626 |
| 2017/0271889 A1* | 9/2017 | Sugeno | H01M 10/42 |
| 2017/0271903 A1* | 9/2017 | Tian | H02J 7/00712 |
| 2017/0288423 A1* | 10/2017 | Wu | H02J 7/0013 |
| 2017/0301960 A1* | 10/2017 | Menard | H01M 4/50 |
| 2017/0308142 A1* | 10/2017 | Altobelli | H02J 7/0013 |
| 2017/0317509 A1* | 11/2017 | Nguyen | H02J 9/061 |
| 2018/0034282 A1* | 2/2018 | Zhang | H02J 7/007186 |
| 2018/0205236 A1* | 7/2018 | Fu | H02J 7/933 |
| 2018/0316206 A1* | 11/2018 | Luo | H01M 10/44 |
| 2018/0323623 A1* | 11/2018 | Nysen | H02J 7/345 |
| 2018/0375359 A1* | 12/2018 | Sultenfuss | H02J 7/007184 |
| 2019/0044129 A1* | 2/2019 | Yadav | H01M 4/244 |
| 2019/0088915 A1* | 3/2019 | Huang | H01M 50/403 |
| 2019/0089023 A1* | 3/2019 | Sastry | H01M 10/46 |
| 2019/0123570 A1* | 4/2019 | Tian | H02J 7/00712 |
| 2019/0131667 A1* | 5/2019 | Huang | H02J 7/0018 |
| 2019/0157726 A1* | 5/2019 | Menard | H01M 4/622 |
| 2019/0305574 A1* | 10/2019 | Matsumura | H02J 7/18 |
| 2019/0319460 A1* | 10/2019 | Taylor | H01M 10/049 |
| 2020/0112070 A1* | 4/2020 | Sato | G01R 31/3644 |
| 2020/0185956 A1* | 6/2020 | Xiao | H02J 7/345 |
| 2020/0195029 A1* | 6/2020 | Fujita | H02J 7/44 |
| 2020/0212440 A1* | 7/2020 | Kolhekar | H01M 4/50 |
| 2020/0244075 A1* | 7/2020 | Park | H02J 7/575 |
| 2020/0259338 A1* | 8/2020 | Taylor | H02J 7/007 |
| 2020/0321789 A1* | 10/2020 | Ono | H02J 7/007182 |
| 2020/0358092 A1* | 11/2020 | Yadav | H01M 4/24 |
| 2020/0388828 A1* | 12/2020 | Ingale | H01M 4/50 |
| 2020/0411846 A1* | 12/2020 | Yadav | H01M 4/38 |
| 2021/0013727 A1* | 1/2021 | Gazit | H02J 3/32 |
| 2021/0098996 A1* | 4/2021 | Ono | H02J 7/0013 |
| 2021/0129700 A1* | 5/2021 | Song | B60L 58/19 |
| 2021/0184475 A1* | 6/2021 | Sun | H02J 7/0024 |
| 2021/0226456 A1* | 7/2021 | Takahashi | H02J 7/0069 |
| 2021/0249875 A1* | 8/2021 | Morimoto | H02J 7/0048 |
| 2021/0280899 A1* | 9/2021 | Yadav | H01M 10/054 |
| 2021/0296912 A1* | 9/2021 | Cho | H02J 7/0024 |
| 2021/0359527 A1* | 11/2021 | Taylor | H01M 4/0447 |
| 2021/0376643 A1* | 12/2021 | Paparrizos | H02M 3/1582 |
| 2021/0391729 A1* | 12/2021 | Nysen | H02J 7/342 |
| 2022/0140636 A1* | 5/2022 | Yasugi | G01R 31/3835 320/134 |
| 2022/0285952 A1* | 9/2022 | Roy | H01M 10/0525 |
| 2023/0225252 A1* | 7/2023 | Liu | A01D 69/02 56/11.9 |
| 2025/0295074 A1* | 9/2025 | Liu | A01D 34/78 |

FOREIGN PATENT DOCUMENTS

| WO | WO-2009128081 A1 * | 10/2009 | H02J 7/0024 |
| WO | WO-2009128082 A1 * | 10/2009 | H02J 7/0069 |
| WO | 2011126909 A2 | 10/2011 | |
| WO | 2014057192 A2 | 7/2014 | |
| WO | 2019060665 A1 | 3/2019 | |

OTHER PUBLICATIONS

International Preliminary Report on Patentability dated Apr. 4, 2020, for International Application No. PCT/US2018/052134, filed on Sep. 21, 2018.

International Search Report and Written Opinion dated Jan. 28, 2019, for International Application No. PCT/US2018/052134, filed on Sep. 21, 2018.

First Examination Report dated Mar. 10, 2022, IN Application No. 202017016702 field Sep. 21, 2018.

* cited by examiner

SYSTEM TO CHARGE CELLS ASSEMBLED INTO A BATTERY

CROSS-REFERENCE TO RELATED APPLICATIONS

This application is a filing under 35 U.S.C. 371 as the National Stage of International Application No. PCT/US2018/052134, filed on Sep. 21, 2018 and entitled, "A SYSTEM TO CHARGE CELLS ASSEMBLED INTO A BATTERY," which claims the benefit of and claims priority to U.S. Provisional Application No. 62/561,996 filed Sep. 22, 2017 and entitled "A System to Optimally Charge Cells Assembled Into a Battery", both of which are incorporated herein by reference in their entirety for all purposes.

BACKGROUND

Batteries can include strings of cells in series or parallel. Small cell-to-cell variations cannot be completely eliminated even when cells are mass produced. These small cell-to-cell differences tend to be amplified as the battery is cycled and can lead to significant performance degradation at the string (battery) level.

To address this problem, several battery management systems are used to charge battery cells. Most battery management systems are, however, designed to work with a specific type of cell chemistry.

For example, to balance batteries composed of a large number of Li-ion cells, passive balancing can be used. Passive balancing takes advantage of the need of Li-ion cells to be charged using a long Constant-Voltage (CV), low-current step at the top of charge. The basic principle of passive balancing is that a resistor is inserted in parallel to each cell. The resistor is activated to reduce the charge current going to a cell with voltage higher than the average voltage. This is shown in FIG. 1. As illustrated, each cell 100 is connected in parallel to a resistor 102 and switch 104. If a cell voltage is greater than the average voltage then, when the cells are in CV charge mode, the switch 104 for the resistor 102 in parallel to that cell 100 is closed to dissipate some of the charge current (up to 500 mA) and slow down the charging of that cell 100.

As another example, the charger for lead acid batteries can include an equalization mode as shown in FIG. 2. The purpose of the equalization mode is to remove the sulphation from the lead plates and to eliminate the stratification of the electrolyte to bring all the cells in the battery to the same voltage. Approximately 2.5-2.6 volts per cell is applied to the battery with the charging current set to a very low value, typically less than 500 mA. The equalization mode may last anywhere from a few hours to over 24 hours depending upon circumstances.

These steps are shown schematically in FIG. 2. As shown occasionally flooded lead acid batteries undertake an equalization step 4 at a voltage higher than the typical float voltage 3 after they traditional full charge 1 and PWM trickle charge 2. The step allows cell voltages to equilibrate by removing sulphation and electrolyte stratification in some of the cells while others are allowed to gas.

SUMMARY

The following presents a simplified summary of the innovation in order to provide a basic understanding of some aspects of the systems and methods described herein. This summary is not an extensive overview. It is intended to neither identify key or critical elements of the systems and/or methods nor delineate the scope of the systems and/or methods. Its sole purpose is to present some concepts in a simplified form as a prelude to the more detailed description that is presented later.

In an embodiment, a charger for a plurality of cells comprises a plurality of cells, a plurality of DC power sources, a common DC source in electrical communication with each of the plurality of DC power sources, and a CPU configured to selectively control the connection between each DC power source and the corresponding cell. Each DC power source of the plurality of DC power sources is selectively connectable to a corresponding cell of the plurality of cells.

In some embodiments, a method of charging a plurality of cells assembled into a battery comprises selectively connecting each DC power source of a plurality of DC power sources to a corresponding cell of a plurality of cells, monitoring a current and voltage supplied to each corresponding cell from each DC power source, comparing, by a CPU, the current and voltage supplied to each corresponding cell to a charging protocol for each corresponding cell, selectively disconnecting each DC power source based on completing the charging protocol for each cell, disconnecting, by the CPU, the plurality of DC power sources from the plurality of cells, connecting the plurality of cells together to form the battery, and supplying a load using the battery. Each cell of the plurality of cells has an individual charging protocol selected from a plurality of charging protocols.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
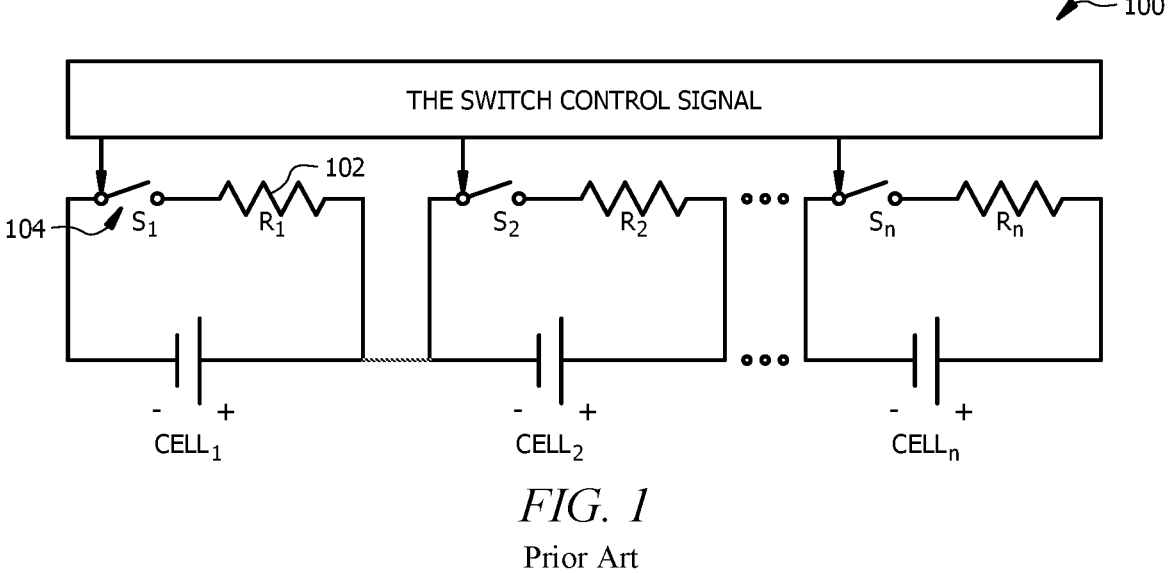
FIG. 1 illustrates a schematic representation of a prior art lithium ion charging system.
Figure 2:
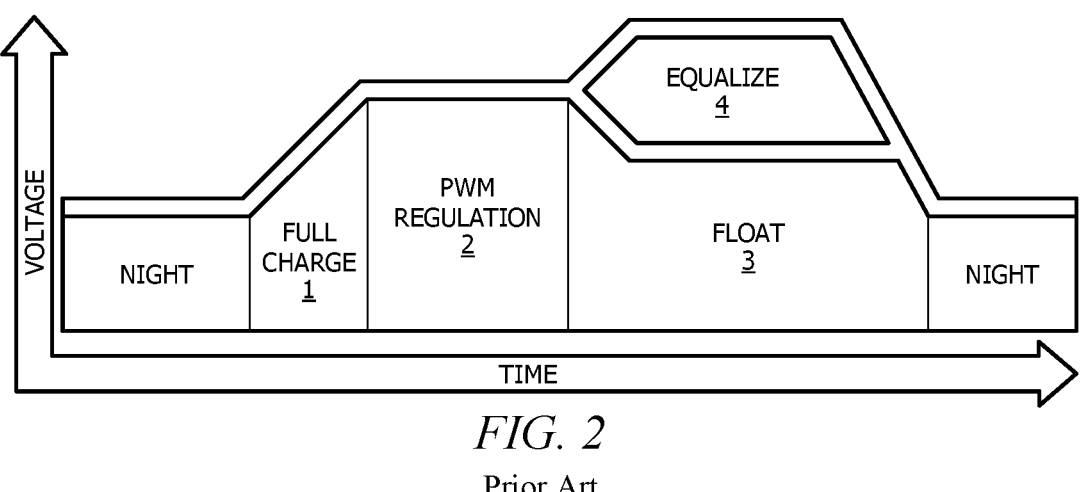
FIG. 2 illustrates a schematic representation of a prior art charging protocol for lead acid batteries.

The present systems and methods are best understood by reference to the detailed figure and description set forth herein.

Embodiments are discussed below with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

Disclosed herein are methods and systems for charging strings of batteries. The system includes a central programmable CPU unit, voltage and current sensors, a charge circuit and a discharge circuit. The system can charge the cells individually and discharges the cells together in a battery. In some embodiments, the cells can be individually controlled and the charging protocols can be controlled and varied remotely. The ability to individually control the cells can allow for different cells to have different properties such as cell size, chemistry, configuration, etc. while still be useful when connected to form a larger battery string.

The system described herein aims to provide a solution that can be used to optimally charge cells in small or large batteries regardless of the specifics of the cell chemistry and to cut the duration of the total charge time.

Consider that N cells are used in a battery. During a charge process the cells can be independently charged. The charger includes N DC-DC Converters (one for each cell) that, from a DC source such as a common DC source, provide the current I and voltage V used to charge each cell according to an individual protocol that can be the same or different among the cells.

Each cell can therefore be charged with a different charge protocol, including, for example, Constant Current (CC) to a certain voltage level, Constant Current (CC) followed by a Constant Voltage (CV) step to a certain minimum current value or a certain maximum or minimum duration, or other suitable charging protocol.

In some embodiments, each cell can be charged by any combination of CC and CV steps using any termination condition as required to increase or maximize charge capacity while reducing or minimizing charge time. The charge protocol can also be changed as each of the cells ages using algorithms embedded in the CPU or transmitted to the CPU through the network. The charge protocols can also be updated as needed for various events such as replacement and/or addition of cells. When the cells need to be discharged they can be automatically connected in a string to form a battery to serve the needs of the application.

Figure 3:
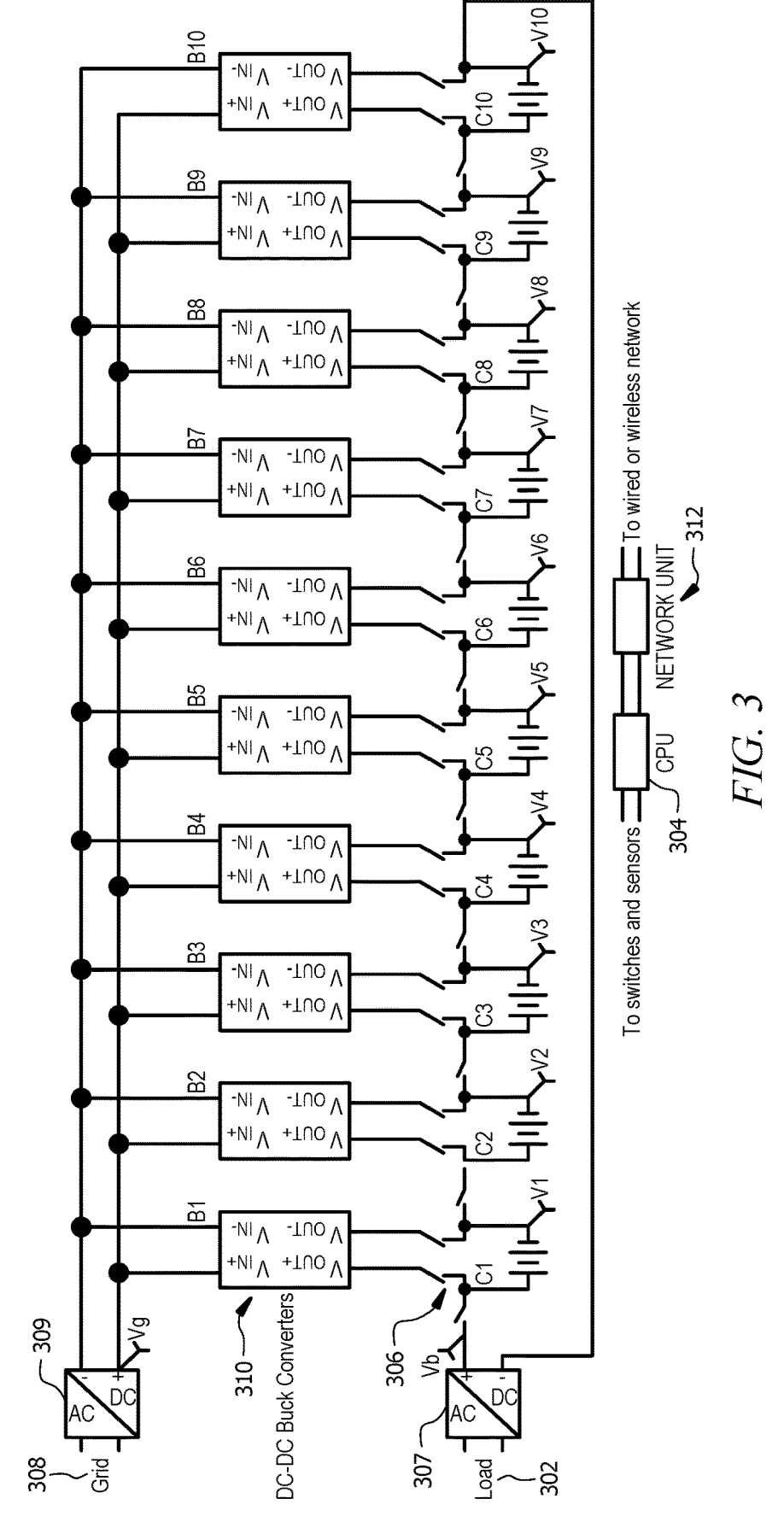
FIG. 3 illustrates a schematic configuration of a charging system according to an embodiment.

FIG. 3 illustrates an embodiment of a system for charging cells in a battery. The system can be used to power loads 302 through a DC-AC converter during a blackout or as needed, where the system can switch from charge to discharge when grid power is not present ($V_g=0$). A central CPU 304 can be in signal communication with each cell 306 to sense cell voltages, charge and discharge current and grid power, to control which cell 306 is being charged and how, and to switch from charge to discharge when the grid power goes off.

As shown in FIG. 3, a generic DC power source 308 such as an electrical grid can be connected through a DC-AC converter 309 and used to drive a plurality of DC-DC converters 310 such as Buck Converters ($B_n$) that charge cells ($C_n$) independently. At discharge, the cells 306 can be combined in a battery in series and discharged, in this case, through a standard DC/AC inverter to serve the load. While shown as being capable of being connected in series for discharge, the cells can also be able to be connected in parallel or remain disconnected in a discharge configuration. A CPU 304 associated with a local memory controls the charge/discharge status and the charging protocol for each cell using sensors data, programmed information or remote instructions.

The CPU can be connected to a network interface 312 that can be used to provide signal communication between the CPU and a network. This interface may allow for remote access to instructions and charging and/or discharge protocols. The remote access can allow for the various protocols (e.g., charging protocols for each cell, discharge configurations, etc.) to be updated over time. In addition, the various protocols can be remotely controlled and modified by pushing the updates to the CPU and an associated memory.

The cells 306 in the string of cells can have any suitable battery chemistry. In some embodiments, the cells can be alkaline cells such as manganese dioxide-zinc batteries, nickel cadmium, nickel metal hydride, nickel iron, and the like. In some embodiments, cells having various chemistries such as lithium-ion, lead acid, and the like can also be used as cells in the string. The ability to individually control the cells and cell charging can allow for each individual cell to have different cell chemistries and/or capacities.

The number of cells selected for the battery can be based on the desired output voltage and capacity. Any number of suitable cells can be used. In some embodiments, between about 4 and about 100 cells, or between about 5 and about 50 cells, or between about 6 and about 30 cells, or between about 8 and about 20 cells, or about 10 cells can be used. While FIG. 3 illustrates 10 cells, this number can be higher or lower as desired.

In use, various cycling protocols can be used. As described herein, each cell can be charged using any combination of CV and/or CC steps. In some embodiments, the cells can be charged using a CC charging step up to a threshold maximum voltage. Then a CV step can optionally be used to a minimum current threshold. Other steps can also be carried out such as a final CV step at a higher or lower voltage than an earlier CV step.

For alkaline cells, the cycling protocol may include charged in a CC step at a predetermined current rate up to a threshold voltage. In some embodiments, the current can be between about 1 Amp (A) and about 10 A, or between about 3 A and about 8 A, or about 6 A. The threshold voltage can be above the cell voltage of around 1.5 V and less than about 4 V, or at about 2 V. An optional CV step can be carried out as needed to further charge the cells. The length of time needed to charge each cell in the string can vary from cell to cell based on specific cell variations as well as different cell chemistries and/or configurations.

In some embodiments, each battery power supply (e.g., AC-DC converter 309) can be used to provide DC current at $V_g$=15V to the N DC-DC Converters 310 ($B_n$) each connected to a cell ($C_n$). An initial CC step can be used. As a cell n reaches the threshold voltage $V_n$, the CPU 304 can disconnect the dedicated DC-DC Converter 310 from that cell 306. At discharge the CPU 304 can disconnect all the cells 306 from the DC-DC Converters 310, and connect two or more cells in series so the load can be served through a the DC-AC inverter 307 until the power supply is restored and/or the cells are exhausted.

Figure 4:
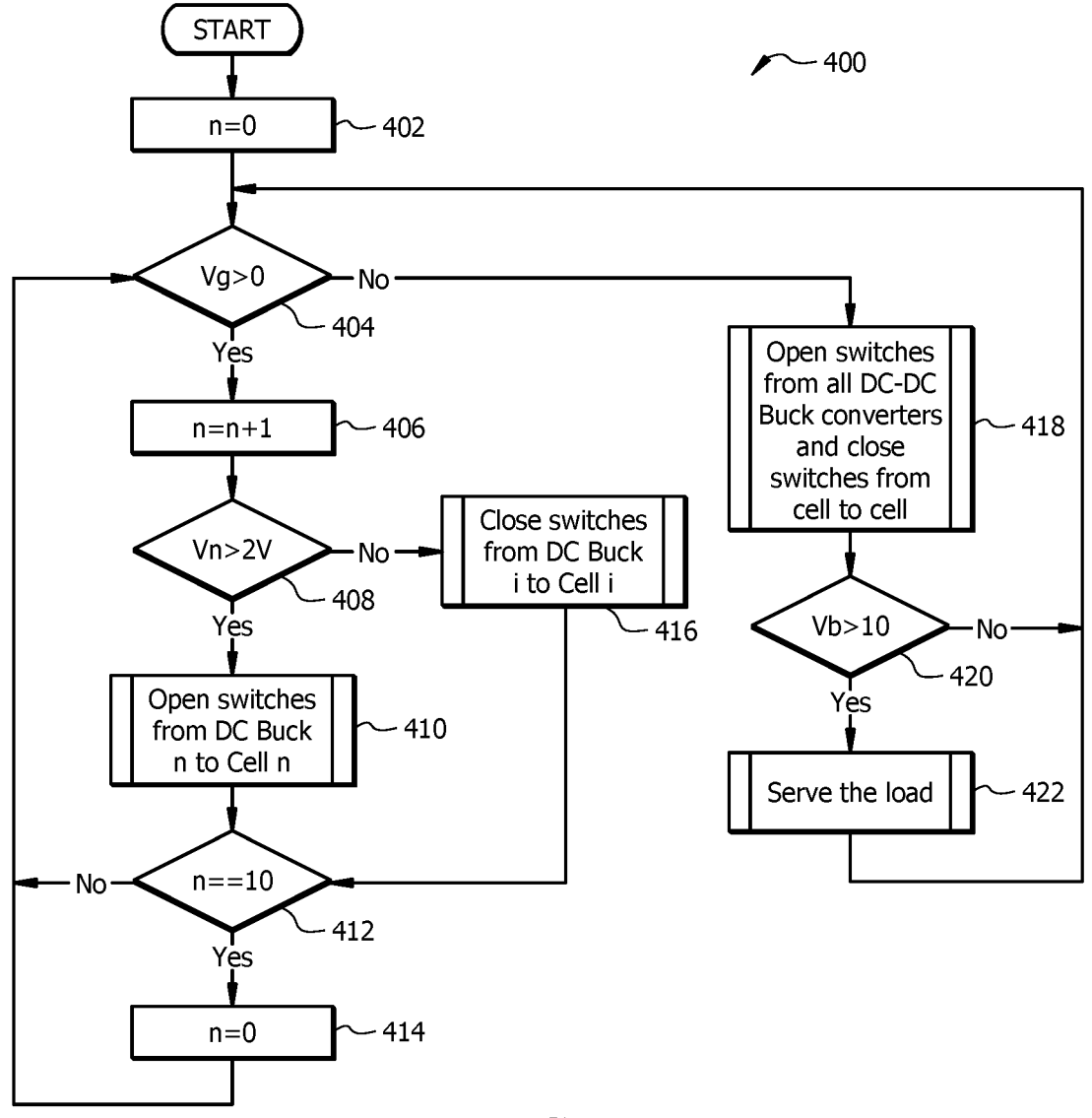
FIG. 4 illustrates a flow diagram of a process for charging cells in a battery according to an embodiment.

FIG. 4 illustrates an embodiment of a process 400 for carrying out the charging protocol for a battery comprising a plurality of cells, indicated as n cells, such as the embodiment illustrated in FIG. 3. In step 402, the process can start with the cell counter set to zero. The process can then continue to step 404 where the available voltage from a power sources such as the grid (Vg) can be detected. If the available voltage for charging is greater than zero volts, then the process can proceed to step 406, where the cell counter is incremented by one. When the process is first initiated, the cell counter will be set to one in step 406. In step 408, the voltage for cell n is sensed and verified relative to a voltage threshold when CC charging is being carried out. As an example, the CC voltage threshold can be 2 V. For the first cell, the voltage can be detected and compared to the 2 V threshold.

When the cell voltage is great than the voltage threshold for CC charging, the process can proceed to step 410, wherein the DC source can be opened to cease charging of the cell. When the cell is already disconnected from the DC source, the cell can remain disconnected from the DC source. When the cell voltage is not greater than the threshold voltage, the process can proceed to step 416 where the DC source can be connected to the cell. When the cell is already connected to the DC source, the cell can remain connected.

The process can then proceed to step 412 where the counter can be compared to the total number of cells to determine if each cell has been checked during the monitoring cycle. For the first cycle, the counter would be set at one, which would be under the total cell count limit. The process would then proceed back to step 404, where the counter would be incremented in step 406 followed by detecting the voltage in step 408 and controlling the connection between the cell and the individual DC source in step 410. When each cell has been checked so that the total cell count is equal to the specific cell, n, being controlled, the process can proceed to step 414 where the counter can be reset to zero. The process can then return to step 404 so that each cell can be rechecked as part of the control loop. This portion of the process may continue periodically so long as the power source continues to provide power for charging. In this process, individual cells may reach full capacity prior to other cells, and the control loop may ensure that cells are disconnected as they reach capacity while the remaining cells continue to be individually charged.

In the event that the power supply ceases to provide power (e.g., when the grid power is detected as having zero volts), the process can proceed from the detection step 404 to the step 418, where the switches from the DC sources are disconnected from the cells. The cells can then be connected in series and the output voltage can be compared to an output voltage threshold in step 420. When the output voltage is above an output voltage threshold, the output of the cells can be passed to a DC-AC converter to serve the load in step 422. The process 400 can then return to step 404 to determine if the power supply (e.g., grid power) has returned. When the output voltage from the cells is less than the output voltage threshold as determined in step 420, the process can return to step 404 to await the return of the grid power for charging.

Figure 5:
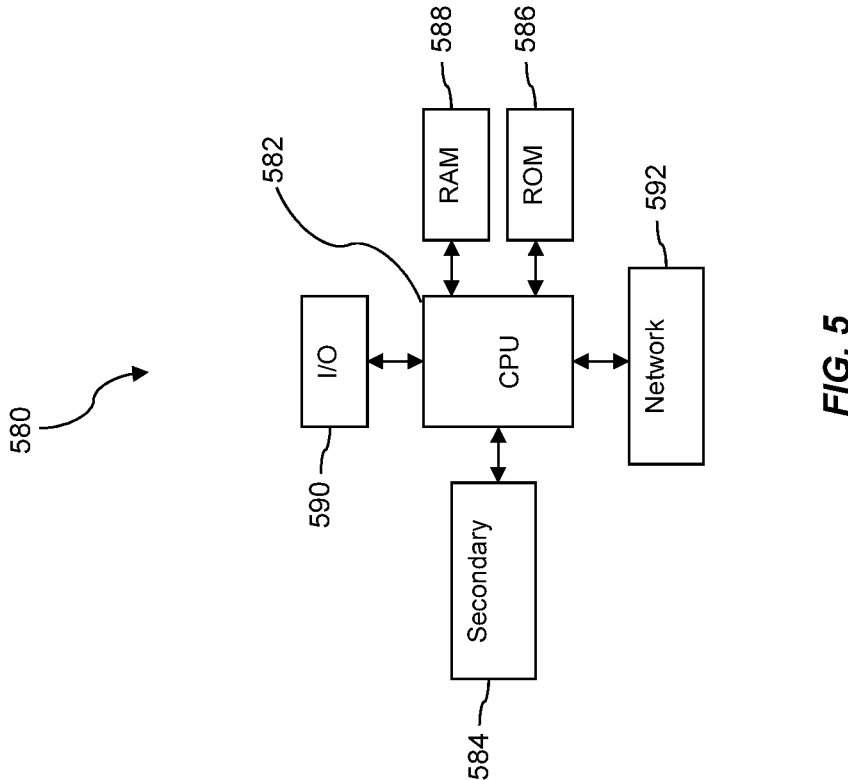
FIG. 5 schematically illustrates a computer useful in some embodiments.

FIG. 5 illustrates a computer system 580 suitable for implementing one or more embodiments disclosed herein, including for use as the CPU and connection to the network to carry out the cycling protocols as described herein. The computer system 580 includes a processor 582 (which may be referred to as a central processor unit or CPU suitable for use as CPU 304 of FIG. 3) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data structures in part by directly accessing the computer program product, for example by reading from a CD-ROM disk inserted into a disk drive peripheral of the computer system 580. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer 580 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

The system of FIG. 3 was implemented in this Example with 10 40 Wh alkaline cells that were charged at a current of I=6 A to $V_{max}$=2V (using CC protocol). To charge each cell a power supply was used to provide DC current at $V_g$=15V to 10 DC-DC Buck Converters ($B_n$) each connected to a cell ($C_n$). As the cell n reached $V_n$=2V the CPU disconnected the dedicated DC-DC Buck Converter from that cell. At discharge the CPU disconnected all the cells from the DC-DC Buck Converters, and connected them in series so the load can be served through a standard DC/AC inverter until $V_b$>10V.

Figure 6:
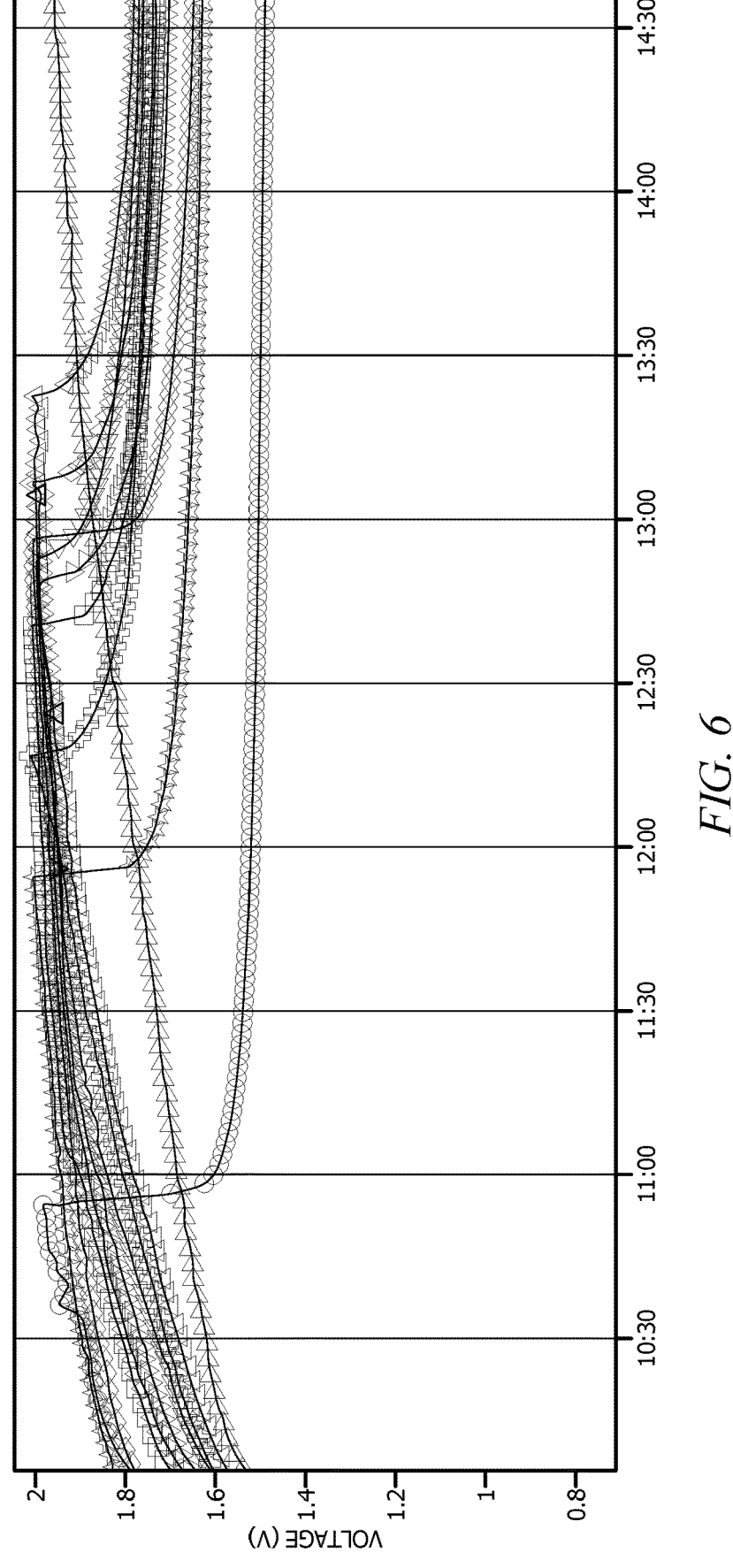
FIG. 6 illustrates the results of a charging process for a plurality of cells in a battery.
Figure 7:
FIG. 7 illustrates the results of a discharge process for a plurality of cells in a battery.

The performance of the system in this example is shown in FIG. 6. FIG. 6 shows the cell voltages as a function of time for the 10 cells each charged at a constant current of 6 A to a maximum of 2V. In this Figure, the orange curve is for the cell that reaches 2V first. The blue curve is for the cell that reaches 2V last. The time difference between the first (orange circles) and the last cell (blue circles) to reach 2V was about 4 hours.

Clearly if the cells had been charged in series at a constant current either the first cell would have been overcharged if charge had continued until the last cell reached 2V, or the last cell would have been undercharged if charging was stopped when the first cell reached 2V. If the average or median cell voltage had been used to terminate charge, some cells would have been overcharged and some undercharged. The use of the system as described herein then leads to optimal charging of each of the cells regardless of the cell chemistry, initial state of charge, or age.

Example 2

When power is not available, the system switches the cells in series so that the load can be served by a commercial DC/AC inverter directly connected to the battery. FIG. 5 illustrates the observed discharge voltage ($V_b$) in blue and current in red. The 10 cells were discharged in series and supplied 400 Wh or 40 Wh per cell at a rate of 50 W or 5 W per cell.

Having described various systems and methods herein, specific embodiments can include, but are not limited to:

In a first embodiment, a charger for a plurality of cells comprises: a plurality of cells; a plurality of DC power sources, wherein each DC power source of the plurality of DC power sources is selectively connectable to a corresponding cell of the plurality of cells; a common DC source in electrical communication with each of the plurality of DC power sources; and a CPU configured to selectively control the connection between each DC power source and the corresponding cell.

A second embodiment can include the charger of the first embodiment, wherein the plurality of cells comprise alkaline cells.

A third embodiment can include the charger of the first or second embodiment, wherein the CPU contains instructions stored in a memory that, when executed on the CPU, configure the CPU to: charge each cell of the plurality of cells individually.

A fourth embodiment can include the charger of the third embodiment, wherein the instructions, when executed on the CPU, further configure the CPU to: charge a first cell of the plurality of cells according to a first charge protocol; and charge a second cell of the plurality of cells according to a second charge protocol, wherein the first charge protocol and the second charge protocol are different.

A fifth embodiment can include the charger of the third or fourth embodiment, wherein the instructions, when executed on the CPU, further configure the CPU to: charge a first cell of the plurality of cells according to a first charge protocol at a first time; and charge the first cell of the plurality of cells according to a second charge protocol at a second time, wherein the first charge protocol and the second charge protocol are different.

A sixth embodiment can include the charger of any one of the first to fifth embodiments, further comprising a network interface in signal communication with the CPU, wherein the network interface is configured to provide updated cycling protocol information to the CPU.

A seventh embodiment can include the charger of any one of the first to sixth embodiments, wherein the CPU contains instructions stored in a memory that, when executed on the CPU, configure the CPU to: connect the plurality of cells in series in a discharge mode of the plurality of cells.

An eighth embodiment can include the charger of any one of the first to seventh embodiments, wherein the CPU contains instructions stored in a memory that, when executed on the CPU, configure the CPU to: detect a supply voltage for the common DC source; charge the plurality of cells using the plurality of DC power sources when a supply voltage from the common DC source is greater than zero; and connect and discharge the plurality of cells in series when the supply voltage from the common DC source is zero.

A ninth embodiment can include the charger of any one of the first to eighth embodiments, wherein the common DC source is in electrical communication with a power grid.

In a tenth embodiment, a method of charging a plurality of cells assembled into a battery comprises: selectively connecting each DC power source of a plurality of DC power sources to a corresponding cell of a plurality of cells; monitoring a current and voltage supplied to each corresponding cell from each DC power source; comparing, by a CPU, the current and voltage supplied to each corresponding cell to a charging protocol for each corresponding cell, wherein each cell of the plurality of cells has an individual charging protocol selected from a plurality of charging protocols; selectively disconnecting each DC power source based on completing the charging protocol for each cell; disconnecting, by the CPU, the plurality of DC power sources from the plurality of cells; connecting the plurality of cells together to form the battery; and supplying a load using the battery.

An eleventh embodiment can include the method of the tenth embodiment, further comprising: supplying the plurality of DC power sources from a single common DC source.

A twelfth embodiment can include the method of the tenth or eleventh embodiment, wherein a first cycling protocol for a first cell of the plurality of cells uses a constant current charging step, and wherein the method further comprises: charging the first cell using a first DC power source of the plurality of DC power sources using a constant current; comparing a charging voltage of the first cell to a threshold charging voltage; determining that the charging voltage exceeds the threshold charging voltage; and disconnecting the first cell from the first DC power source.

A thirteenth embodiment can include the method of the twelfth embodiment, wherein a second cycling protocol for a second cell of the plurality of cells uses a constant current charging step, and wherein the method further comprises: charging the second cell using a first DC power source of the plurality of DC power sources using a constant current; comparing a charging voltage of the second cell to a threshold charging voltage; determining that the charging voltage exceeds the threshold charging voltage; and disconnecting the second cell from the first DC power source, wherein the first cell and the second cell are disconnected at different times.

A fourteenth embodiment can include the method of the thirteenth embodiment, wherein the constant current is a current between about 4 Amps and about 8 Amps, and wherein the threshold charging voltage is about 2 V.

A fifteenth embodiment can include the method of any one of the tenth to fourteenth embodiments, wherein the plurality of cells comprise alkaline cells.

A sixteenth embodiment can include the method of any one of the tenth to fifteenth embodiments, further comprising: storing the plurality of charging protocols in a memory; and updating the plurality of charging protocols in the memory; and using a different charging protocol of the plurality of charging protocols for a first cell of the plurality of cells after updating the plurality of charging protocols in the memory.

A seventeenth embodiment can include the method of the sixteenth embodiment, wherein updating the plurality of charging protocols comprises obtaining the plurality of charging protocols over a network connection.

An eighteenth embodiment can include the method of any one of the tenth to seventeenth embodiments, wherein the load comprises an electrical grid, and wherein the plurality of DC power sources are in electrical connection with the electrical grid when each DC power source of a plurality of DC power sources is selectively connected to the corresponding cell of a plurality of cells.

A nineteenth embodiment can include the method of any one of the tenth to eighteenth embodiments, wherein the plurality of cells comprise manganese dioxide-zinc cells.

A twentieth embodiment can include the method of the nineteenth embodiment, wherein the plurality of cells are charged with a charging protocol of the plurality of charging protocols comprising a constant current charging step of about 6 Amps to a voltage threshold of about 2 V.

In a twenty first embodiment, a charger to charge battery cells separately comprises a charger using a common DC source.

A twenty second embodiment can include the charger of the twenty first embodiment, with a charge protocol optimized for Alkaline cells.

A twenty third embodiment can include the charger of the twenty first or twenty second embodiment, with a charge protocol that can be different for each cell.

A twenty fourth embodiment can include the charger of any one of the twenty first to twenty third embodiments, with a charge protocol that can change over time for each cell.

A twenty fourth embodiment can include the charger of any one of the twenty first to twenty fourth embodiments, with a charge protocol that can be remotely controlled for each cell.

A twenty sixth embodiment can include the charger of any one of the twenty first to twenty fifth embodiments, where the cells are discharged in series.

A twenty seventh embodiment can include the charger of the twenty sixth embodiment that can charge cells when grid power or power from other generation sources is present and discharge cells when grid power or power from other generation sources is not present.

A twenty eighth embodiment can include the charger of the twenty seventh embodiment that is grid tied so that cells can be charged from the grid or from other generation sources or discharge to the grid as desired to control the power served by the grid or by other generation source.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A charger for a plurality of cells, the charger comprising:
   the plurality of cells;
   a plurality of DC power sources, wherein each DC power source of the plurality of DC power sources is selectively connectable to a corresponding cell of the plurality of cells;
   a common DC source in electrical communication with each of the plurality of DC power sources;
   voltage and current sensors; and
   a CPU configured to selectively control a connection between each DC power source and the corresponding cell and configured to selectively provide a plurality of charging protocols comprising charging a first cell of the plurality of cells with a first charging protocol comprising a constant current to a certain voltage level, a second cell of the plurality of cells with a second charging protocol comprising a constant current followed by a constant voltage to one of a certain minimum current value, a certain maximum duration, or a certain minimum duration, and a third cell of the plurality of cells with a third charging protocol comprising a final constant voltage at a higher or a lower voltage than the constant voltage of the second charging protocol, wherein the first charging protocol, the second charging protocol, and the third charging protocol are different, and wherein each of the first charging protocol, the second charging protocol, and the third charging protocol apply between a time the DC power source of the plurality of DC power sources is connected to the corresponding cell until the DC power source is disconnected from the corresponding cell.

2. The charger of claim 1, wherein a charge protocol is different for each cell.

3. The charger of claim 1, wherein a charge protocol is remotely controlled for each cell.

4. The charger of claim 1, wherein the cells are discharged in series.

5. The charger of claim 1, wherein charge cells when a grid power or a power from other generation sources is present and discharge cells when the grid power or the power from other generation sources is not present.

6. The charger of claim 1, wherein a grid tied so cells are charged from the grid or from other generation sources or discharge to the grid as desired to control power served by the grid or by other generation source.

7. The charger of claim 1, wherein the CPU contains instructions stored in a memory that, when executed on the CPU, configure the CPU to:
   charge each cell of the plurality of cells individually.

8. The charger of claim 1, further comprising a network interface in signal communication with the CPU, wherein the network interface is configured to provide updated cycling protocol information to the CPU.

9. The charger of claim 1, wherein the CPU contains instructions stored in a memory that, when executed on the CPU, configure the CPU to:
   connect the plurality of cells in series in a discharge mode of the plurality of cells.

10. The charger of claim 1, wherein the CPU contains instructions stored in a memory that, when executed on the CPU, configure the CPU to:

detect a supply voltage for the common DC source;

charge the plurality of cells using the plurality of DC power sources when a supply voltage from the common DC source is greater than zero; and connect and discharge the plurality of cells in series when the supply voltage from the common DC source is zero.

11. The charger of claim 1, wherein the plurality of cells comprises alkaline cells.

12. The charger of claim 11, wherein the first, second, and third charge protocols are optimized for the alkaline cells.

13. A method of charging a plurality of cells assembled into a battery, the method comprising:

selectively connecting each DC power source of a plurality of DC power sources to a corresponding cell of the plurality of cells;

monitoring a current and voltage supplied to each corresponding cell from each DC power source;

detecting voltage with voltage sensors and current with current sensors;

comparing, by a CPU, the current and voltage suppled to each corresponding cell to a charging protocol for each corresponding cell, wherein each cell of the plurality of cells has an individual charging protocol selected from a plurality of charging protocols, wherein the plurality of charging protocols comprise charging a first cell with a first charging protocol comprising a constant current to a certain voltage level, a second cell with a second charging protocol comprising a constant current followed by a constant voltage to one of a certain minimum current value, a certain maximum duration, or a certain minimum duration, and a third cell with a third charging protocol comprising a final constant voltage at a higher or a lower voltage than the constant voltage of the second charging protocol;

selectively disconnecting each DC power source based on completing the charging protocol for each cell, wherein the first charging protocol applies between a time the first cell is selectively connected to a first DC power source of the plurality of DC power sources and a time the first cell is selectively disconnected from the first DC power source, and wherein the second charging protocol applies between a time the second cell is selectively connected to a second DC power source of the plurality of DC power sources and a time the second cell is selectively disconnected from the second DC power source, and wherein the third charging protocol applies between a time the third cell is selectively connected to a third DC power source of the plurality of DC power sources and a time the third cell is selectively disconnected from the third DC power source;

disconnecting, by the CPU, the plurality of DC power sources from the plurality of cells;

connecting the plurality of cells together to form the battery; and supplying a load using the battery.

14. The method of claim 13, further comprising:

supplying the plurality of DC power sources from a single common DC source.

15. The method of claim 13, wherein the plurality of cells comprises alkaline cells.

16. The method of claim 13, further comprising:

storing the plurality of charging protocols in a memory; and updating the plurality of charging protocols in the memory; and using a different charging protocol of the plurality of charging protocols for the first cell of the plurality of cells after updating the plurality of charging protocols in the memory.

17. The method of claim 16, wherein updating the plurality of charging protocols comprises obtaining the plurality of charging protocols over a network connection.

18. The method of claim 13, further comprising:

charging the first cell using the first DC power source of the plurality of DC power sources using the constant current;

comparing a charging voltage of the first cell to a threshold charging voltage;

determining that the charging voltage exceeds the threshold charging voltage; and disconnecting the first cell from the first DC power source.

19. The method of claim 18, wherein a second cycling protocol for a second cell of the plurality of cells uses the constant current charging step, and wherein the method further comprises:

charging the second cell using the second DC power source of the plurality of DC power sources using the constant current;

comparing the charging voltage of the second cell to the threshold charging voltage;

determining that the charging voltage exceeds the threshold charging voltage; and disconnecting the second cell from the second DC power source, wherein the first cell and the second cell are disconnected at different times.

20. The method of claim 19, wherein the constant current is a current between about 4 Amps and about 8 Amps, and wherein the threshold charging voltage is about 2 V.

* * * * *